(12) United States Patent
Gomes et al.

(10) Patent No.: US 7,287,767 B1
(45) Date of Patent: Oct. 30, 2007

(54) WALKING AID APPARATUS

(76) Inventors: Kenneth M. Gomes, 8 Pimlico Terrace, Lake Oswego, OR (US) 97035; Mason Gomes, 8 Pimlico Terrace, Lake Oswego, OR (US) 97035

( * ) Notice: Subject to any disclaimer, the term of this patent is extended or adjusted under 35 U.S.C. 154(b) by 444 days.

(21) Appl. No.: 11/098,148

(22) Filed: Apr. 4, 2005

(51) Int. Cl.
*B62M 1/00* (2006.01)
(52) U.S. Cl. .................. 280/87.021; 280/87.041; 280/87.05; 482/66; 482/68
(58) Field of Classification Search ............ 280/87.01, 280/87.021, 87.041, 87.05, 87.051; 119/727; 482/66, 68; 135/85
See application file for complete search history.

(56) References Cited

U.S. PATENT DOCUMENTS

| | | | | |
|---|---|---|---|---|
| 1,668,623 | A * | 5/1928 | Avril | ...................... 280/87.021 |
| 3,256,035 | A | 6/1966 | Garringer | |
| 4,254,948 | A * | 3/1981 | Jacobs | ......................... 482/68 |
| D283,884 | S | 5/1986 | Erfurth | |
| 4,867,188 | A * | 9/1989 | Reid | ........................... 135/67 |
| 5,158,313 | A | 10/1992 | Becker | |
| 5,411,035 | A * | 5/1995 | Stone | ......................... 128/845 |
| D363,051 | S | 10/1995 | Lanzillo | |
| 5,531,238 | A | 7/1996 | Azzarelli et al. | |
| 5,702,326 | A * | 12/1997 | Renteria | ..................... 482/68 |
| 5,800,317 | A | 9/1998 | Accetta | |
| 5,839,740 | A | 11/1998 | Seeger | |
| 6,070,603 | A * | 6/2000 | Politz | ........................... 135/67 |
| 6,149,170 | A | 11/2000 | Dotson | |
| 6,161,860 | A | 12/2000 | Corneau | |
| 6,296,263 | B1 | 10/2001 | Schultz et al. | |
| 6,634,660 | B2 | 10/2003 | Miller | |
| 2001/0038186 | A1* | 11/2001 | Wychozowycz | ....... 280/87.021 |
| 2003/0090076 | A1* | 5/2003 | Beleski, Jr. | ............ 280/87.041 |
| 2004/0012165 | A1* | 1/2004 | Miller | ..................... 280/87.01 |
| 2004/0100053 | A1* | 5/2004 | Chen | .................... 280/87.041 |
| 2004/0201192 | A1* | 10/2004 | Ramm | .................... 280/87.021 |
| 2005/0217409 | A1* | 10/2005 | Andersson et al. | ........ 74/502.2 |
| 2006/0033297 | A1* | 2/2006 | Miller | ................... 280/87.021 |

* cited by examiner

*Primary Examiner*—Christopher P. Ellis
*Assistant Examiner*—Vaughn T. Coolman

(57) ABSTRACT

A walking aid apparatus includes a pair of rods each having a first end and a second end. A central member is attached to the second ends. A pole is attached to the central member. A rear wheel is rotatably coupled to the pole. A sleeve is attached to each of the first ends. A post extends through the sleeve and is selectively rotated with respect to the sleeve. The post has an upper end positioned above the sleeve and a lower end positioned below the sleeve. A pair of legs is attached to an outer surface of the post below the sleeve. Each of the legs extends downward below the lower end. An axle is attached to the legs. Each of a pair of front wheels is rotatably attached to the axle. A leg receiving member is attached to and extends upwardly from the rods.

11 Claims, 3 Drawing Sheets

US 7,287,767 B1

WALKING AID APPARATUS

BACKGROUND OF THE INVENTION

1. Field of the Invention

The present invention relates to walking aid devices and more particularly pertains to a new walking aid device which allows for greater mobility while supporting an injured leg.

2. Description of the Prior Art

The use of walking aid devices is known in the prior art. U.S. Pat. No. 5,800,317 describes a cart for holding an injured leg while a person is walking. Another type of walking aid device is U.S. Pat. No. 5,839,740 which also includes a cart that allows someone to walk while having an injured leg supported. Yet another such device is found in U.S. Pat. No. 6,634,660.

While these devices fulfill their respective, particular objectives and requirements, the need remains for a device that supports an injured leg while allowing for greater mobility and which includes adjustability for persons of different heights. Additionally, the device should include a means for allowing a person to readily steer the device so that their movement is improved, particularly around corners and in relatively tight spaces such as a shopping isles.

SUMMARY OF THE INVENTION

The present invention meets the needs presented above by comprising a pair of rods each having a first end and a second end. Each of the rods has a bend therein positioned nearer to the second ends than the first ends so that each of the rods has a horizontal portion positioned between the bends and the first ends, and a downwardly extending vertical portion positioned between the bends and the second ends. A central member is attached to the second ends. A pole is attached to the central member. A rear wheel is rotatably coupled to the pole. The rear wheel has an axis of rotation that is orientated perpendicular to each of the horizontal and vertical portions. A sleeve is attached to each of the first ends. A post extends through the sleeve and is selectively rotated with respect to the sleeve. The post has an upper end positioned above the sleeve and a lower end positioned below the sleeve. A pair of legs is attached to an outer surface of the post below the sleeve. Each of the legs extends downward below the lower end. An axle is attached to the legs. Each of a pair of front wheels is rotatably attached to the axle. A leg receiving member is attached to and extends upwardly from the horizontal portions of the rods.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
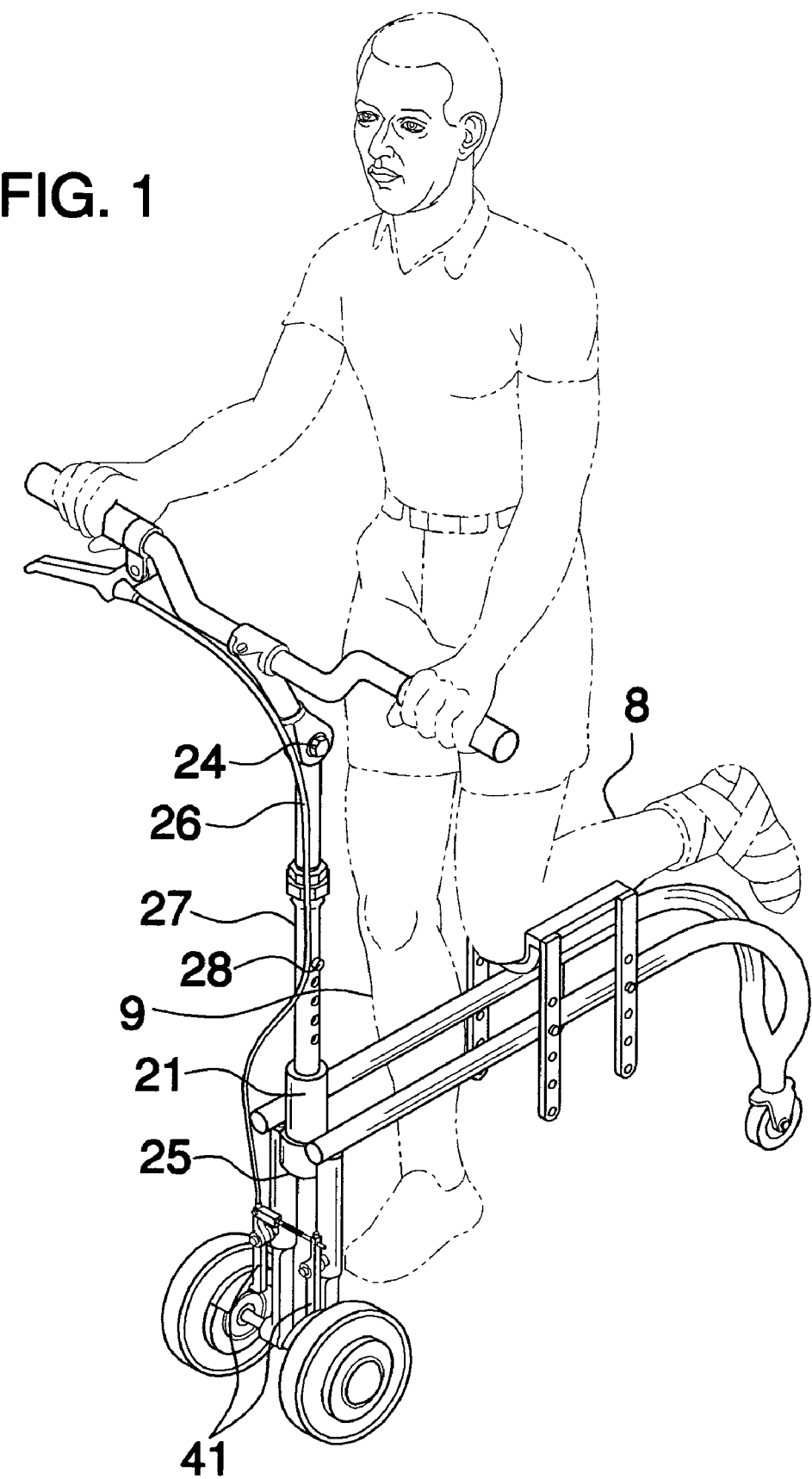
FIG. 1 is a perspective in-use view of a walking aid apparatus according to the present invention.
Figure 2:
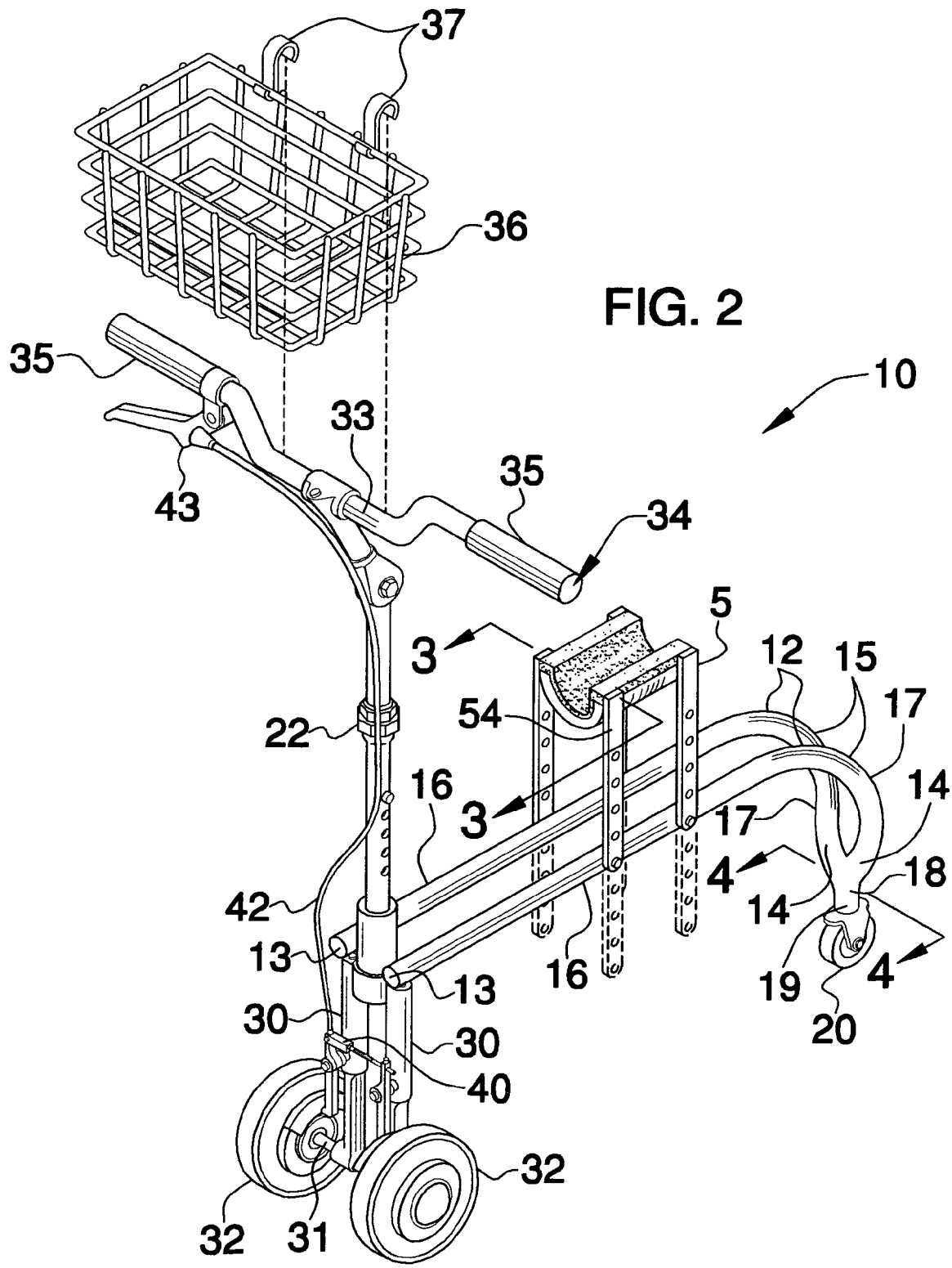
FIG. 2 is a perspective view of the present invention.
Figure 3:
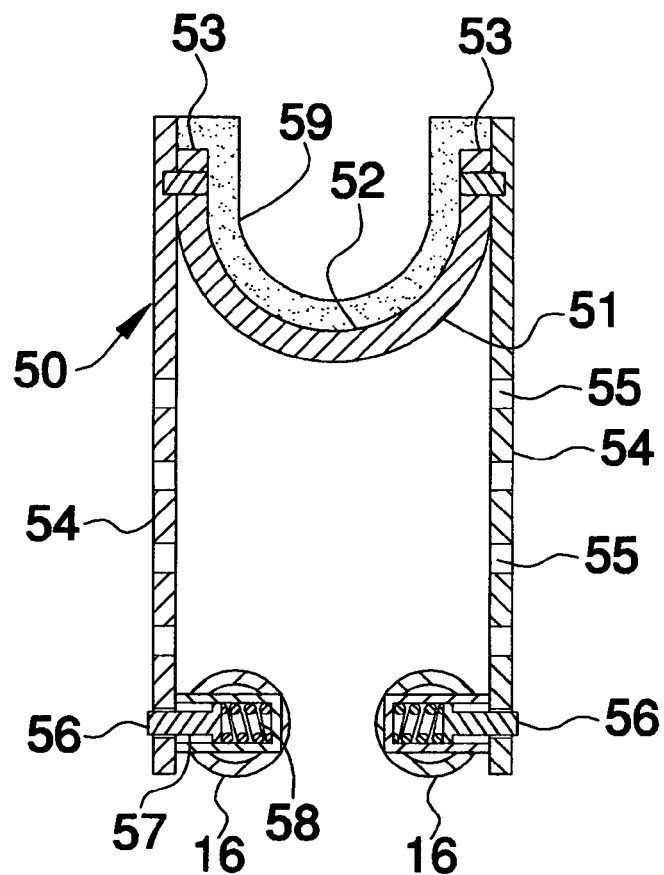
FIG. 3 is a cross-sectional view taken along line 3-3 of FIG. 2 of the present invention.
Figure 5:
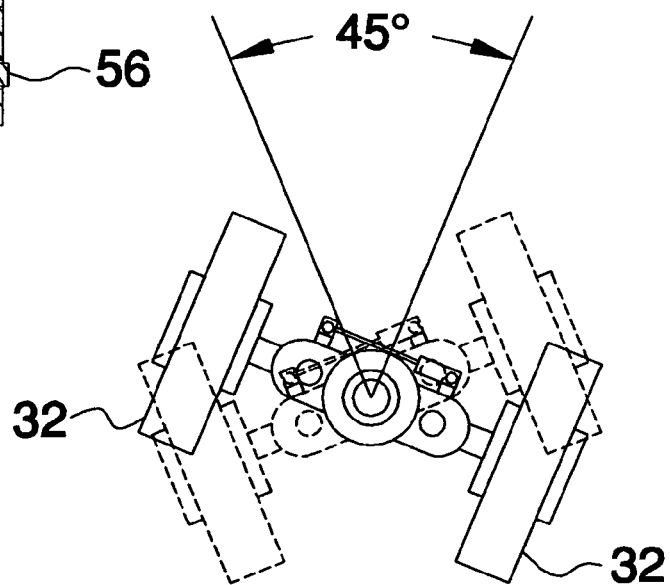
FIG. 5 is a bottom view of the front wheels of the present invention.
Figure 4:
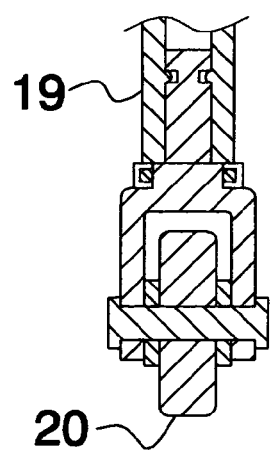
FIG. 4 is a cross-sectional view taken along line 4-4 of FIG. 2 of the present invention.

With reference now to the drawings, and in particular to FIGS. 1 through 5 thereof, a new walking aid device embodying the principles and concepts of the present invention and generally designated by the reference numeral 10 will be described.

As best illustrated in FIGS. 1 through 5, the walking aid apparatus 10 generally comprises a pair of rods 12 each having a first end 13 and a second end 14. Each of the rods 12 has a bend 15 therein positioned nearer to the second ends 14 than the first ends 13 so that each of the rods 12 has a horizontal portion 16 positioned between the bends 15 and the first ends 13 and a downwardly extending vertical portion 17 positioned between the bends 15 and the second ends 14. A central member 18 is attached to the second ends 14. A pole 19 is attached to the central member 18 and extends downwardly form the central member 18. A rear wheel 20 is rotatably coupled to the pole 19. The rear wheel 20 has an axis of rotation orientated perpendicular to each of the horizontal 16 and vertical 17 portions.

A sleeve 21 is attached to each of the first ends 13. The horizontal portions 16 are orientated parallel to each other and the first ends 13 are preferably positioned on opposite sides of the sleeve 21 with respect to each other.

A post 22 extends through the sleeve 21 and is selectively rotated with respect to the sleeve 21. The post 22 has an upper end 24 positioned above the sleeve 21 and a lower end 25 positioned below the sleeve 21. The post 22 is selectively telescoping and includes an upper portion 26 and a lower portion 27 slidably coupled together. A pin 28 may be extended through the upper 26 and lower 27 portions to secure the post 22 at a selected length.

A pair of legs 30 is attached to an outer surface of the post 22 below the sleeve 21. Each of the legs 30 extends downward below the lower end 25. The legs 30 are orientated parallel to each other and are positioned on opposite sides of the post 22 with respect to each other. An axle 31 is attached to the legs 30 preferably adjacent to a bottom end of the legs 30. Each of a pair of front wheels 32 is rotatably attached to the axle 31 so that each of the legs 30 is positioned between the front wheels 32. A handle bar 33 is attached to the upper end 24 of the post 22 and includes a pair of outer ends 34. A pair of grips 35 is attached to the handle bar 33 and each of the grips 35 is positioned adjacent to one of the outer ends 34. A basket 36 has a pair of hooks 37 attached thereto. The hooks 36 are positionable on the handle bar 33 for selectively attaching the basket 36 to the handle bar 33.

A braking apparatus 40 is coupled to the legs 30 for selectively retarding rotation of the front wheels 32. The braking apparatus 40 includes a pair of wheel engaging members 41 each pivotally coupled to one of the legs 30. A cable 42 is attached to the wheel engaging members 41 so that when the distal ends of the wheel engaging members 41, with respect to the front wheels 32, are pulled upwardly, the proximal ends abut and frictionally engage the front wheels 32. The cable 42 is attached to a hand actuator 43 mounted on the handle bar 33.

A leg receiving member 50 is attached to and extends upwardly from the horizontal portions 16 of the rods 12. A height of the leg receiving member 50 is selectively adjustable with respect to the horizontal portions 16. The leg receiving member 50 includes a saddle 51 that has a semi-cylindrical shape and has a concave upper surface 52. The saddle 51 has a pair of upper edges 53. A plurality of elongated supports 54 each is attached to the saddle 51 and extends downwardly therefrom. Each of the elongated supports 54 is selectively attached to one of the horizontal portions 16 so that the upper edges 53 are horizontally aligned and each extends toward the post 22. Each of the supports 54 has a plurality of vertically aligned apertures 55 extending therethrough. A plurality of detents 56 is mounted in each of the horizontal portions 16 so that each of the horizontal portions 16 has at least two detents 56 therein. Each of the detents 56 is positioned in a well 57 having a spring 58 therein so that each of the detents 56 is biased outwardly of a respective one of the horizontal portions 16. The detents 56 are each positioned for being removably extended into one of the apertures 55. By selecting the apertures 55 into which the detents 56 will be extended, the user may select the height of the saddle 51 with respect to the rods 12. A cushioning material 59 is attached to and covers the upper surface 52 of the saddle 51.

In use, the apparatus 10 aids a person to walk when they have an injured foot or lower leg. The leg receiving member 50 is positioned so that when a leg 8 is placed in the saddle 51, the knee is positioned at generally the same height of the knee of the uninjured leg 9 when it is extended. The person then uses the apparatus 10 as a cart or scooter and places their weight on the saddle 51 and walks normally with the uninjured leg 9.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A walking aid assembly comprising:
    a pair of rods each having a first end and a second end, each of said rods having a bend therein positioned nearer to said second ends than said first ends such that each of said rods has a horizontal portion positioned between said bends and said first ends and a downwardly extending vertical portion positioned between said bends and said second ends, a central member being attached to said second ends, a pole being attached to said central member, a rear wheel being rotatably coupled to said pole, said rear wheel having an axis of rotation orientated perpendicular to each of said horizontal and vertical portions;
    a sleeve being attached to each of said first ends;
    a post extending through said sleeve and being selectively rotated with respect to said sleeve, said post having an upper end positioned above said sleeve and a lower end positioned below said sleeve;
    a pair of legs being attached to an outer surface of said post below said sleeve, each of said legs extending downward below said lower end;
    an axle being attached to said legs, each of a pair of front wheels being rotatably attached to said axle;
    a leg receiving member being attached to and extending upwardly from said horizontal portions of said rods.

2. The assembly according to claim 1, wherein said horizontal portions are orientated parallel to each other.

3. The assembly according to claim 1, wherein said post is selectively telescoping.

4. The assembly according to claim 1, wherein said legs are positioned on opposite sides of said post with respect to each other.

5. The assembly according to claim 4, wherein each of said legs is positioned between said front wheels.

6. The assembly according to claim 1, further including a braking apparatus being mechanically coupled to said legs for selectively retarding rotation of said front wheels.

7. The assembly according to claim 1, wherein a height of said leg receiving member is selectively adjustable with respect to said horizontal portions.

8. The assembly according to claim 7, wherein said leg receiving member includes:
    a saddle having a semi-cylindrical shape and having a concave upper surface, said saddle having a pair of upper edges;
    a plurality of elongated supports each being attached to said saddle and extending downwardly therefrom, each of said elongated supports being selectively attached to one of said horizontal portions such that said upper edges are horizontally aligned and extend toward said post, each of said supports having a plurality of vertically aligned apertures extending therethrough; and
    a plurality of detents being mounted in each of said horizontal portions such that each of said horizontal portions has at least two detents therein, each of said detents being biased outwardly of a respective one of said horizontal portions, each of said detents being positioned for being removably extended into one of said apertures.

9. The assembly according to claim 8, further including a cushioning material being attached to and covering said upper surface of said saddle.

10. A walking aid assembly comprising:
    a pair of rods each having a first end and a second end, each of said rods having a bend therein positioned nearer to said second ends than said first ends such that each of said rods has a horizontal portion positioned between said bends and said first ends and a downwardly extending vertical portion positioned between said bends and said second ends, a central member being attached to said second ends, a pole being attached to said central member, said pole extending downwardly, a rear wheel being rotatably coupled to said pole, said rear wheel having an axis of rotation orientated perpendicular to each of said horizontal and vertical portions;

a sleeve being attached to each of said first ends, said horizontal portions being orientated parallel to each other;

a post extending through said sleeve and being selectively rotated with respect to said sleeve, said post having an upper end positioned above said sleeve and a lower end positioned below said sleeve, said post being selectively telescoping;

a pair of legs being attached to an outer surface of said post below said sleeve, each of said legs extending downward below said lower end and being orientated parallel to each other, said legs being positioned on opposite sides of said post with respect to each other;

an axle being attached to said legs, each of a pair of front wheels being rotatably attached to said axle such that each of said legs is positioned between said front wheels;

a handle bar being attached to said upper end of said post;

a braking apparatus being mechanically coupled to said legs for selectively retarding rotation of said front wheels;

a leg receiving member being attached to and extending upwardly from said horizontal portions of said rods, a height of said leg receiving member being selectively adjustable with respect to said horizontal portions, said leg receiving member including;

a saddle having a semi-cylindrical shape and having a concave upper surface, said saddle having a pair of upper edges;

a plurality of elongated supports each being attached to said saddle and extending downwardly therefrom, each of said elongated supports being selectively attached to one of said horizontal portions such that said upper edges are horizontally aligned and extend toward said post, each of said supports having a plurality of vertically aligned apertures extending therethrough;

a plurality of detents being mounted in each of said horizontal portions such that each of said horizontal portions has at least two detents therein, each of said detents being biased outwardly of a respective one of said horizontal portions, each of said detents being positioned for being removably extended into one of said apertures;

a cushioning material being attached to and covering said upper surface of said saddle.

11. The assembly according to claim 10, further including a basket being removably attached to the handle bar.

* * * * *